Patented Feb. 14, 1950

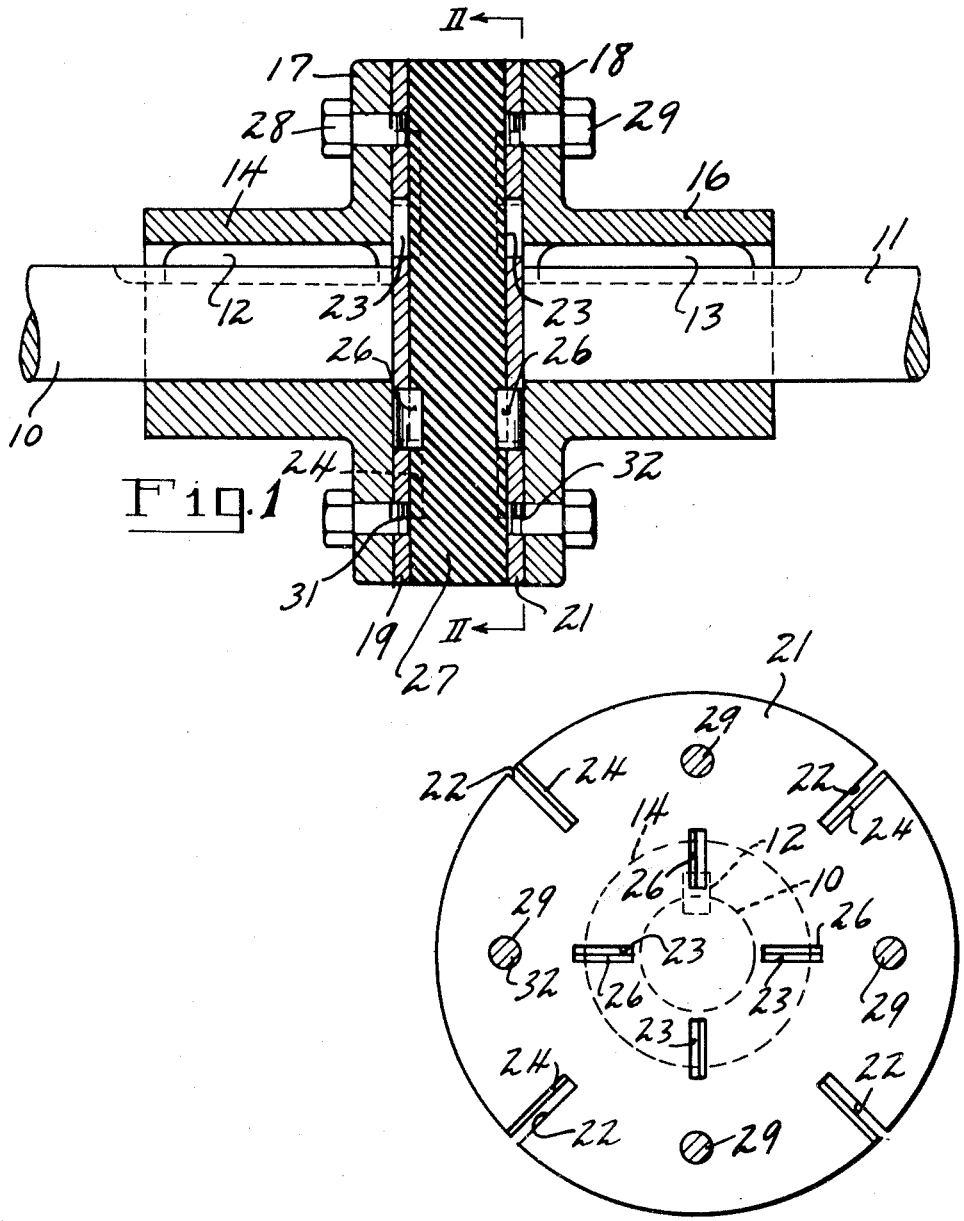

2,497,623

UNITED STATES PATENT OFFICE 2,497,623

FLEXIBLE COUPLING

Hardy Nolen, Birmingham, Ala.

Application July 10, 1946, Serial No. 682,677

1 Claim. (Cl. 64—13)

This invention relates to flexible couplings of the type for connecting driving to driven shafts and which compensate for misalignment of the shafts, and has for an object the provision of apparatus of the character designated which shall be simple and sturdy of construction and capable of being quickly applied and renewed without disturbing the driving and driven shafts.

A more specific object of my invention is to provide a flexible coupling element comprised of a pair of metal disks having plane outer surfaces for insertion between the flanges of coupling members permanently connected to the driving and driven shafts. A resilient rubber disk is interposed between the metal disks and is vulcanized thereto, and fastening means cooperate between the flanges and adjacent metal disks.

Hitherto in the art, flexible couplings have been proposed in which the flexible element has comprised a rubber member inserted between and secured to coupling members which were, in turn, secured to the driving and driven shafts. In all such devices with which I have been familiar, it has been necessary to separate the driving and driven members in order to mount or replace the coupling element, which operation requires considerable time and skilled labor. This difficulty is overcome in accordance with my invention in which I provide coupling members having flanges with plane surfaces and provide a flexible coupling element for insertion between the coupling members and comprising a pair of metal disks having plane outer surfaces and a resilient rubber disk interposed between and vulcanized to the metal disks. The flexible coupling element is secured to the flanges of the coupling members by bolts extending through the flanges and threaded into the disks. In order to mount the coupling element or to replace it, it is only necessary to remove such bolts and slip one element out and the other in place and secure it without disturbing the driving and driven shafts.

A device embodying features of my invention is illustrated in the accompanying drawing, forming a part of this application, in which Fig. 1 is a longitudinal sectional view of a coupling made according to my invention; and Fig. 2 is a sectional view taken along the line II—II of Fig. 1.

Referring to the drawing for a better understanding of my invention, I show two shafts 10 and 11, one of which may be assumed to be a driving shaft and the other a driven shaft. Secured to the shafts in any suitable manner, as by keys 12 and 13, are two coupling members embodying hubs 14 and 16, having flanges 17 and 18 with plane facing, or inner surfaces. The means for securing the coupling members to the shafts should not extend between the opposed faces of the flanges 17 and 18.

Interposed between the flanges 17 and 18 is my improved flexible coupling element which is comprised of metal disks 19 and 21 having plane outer surfaces to lie flat against the inner surfaces of the flanges 17 and 18. The disks 19 and 21 may be slotted as shown at 22 and 23 in Fig. 2 with the material cut away to form the slots turned inward to form lugs 24 and 26. Interposed between the disks 19 and 21 and vulcanized thereto is a relatively thick, resilient rubber disk, or pad 27.

The flexible coupling element is secured to the flanges 17 and 18 by means of a plurality of bolts 28 and 29, respectively, which pass through suitable holes in the flanges and which are threaded into the metal disks 19 and 21 as shown at 31 and 32. With this arrangement, it will be seen that the flexible coupling element may be mounted by inserting it radially between the flanges 17 and 18 and screwing the bolts 28 and 29 down. In case of failure, it is only necessary to remove the bolts 28 and 29, drop out the worn unit, and replace with a new flexible coupling unit, without loosening the coupling flanges 17 and 18 from the shaft. It will be seen that this saves a great deal of time and does not require a skilled mechanic to replace the coupling element.

In operation, the resilient rubber disk, or pad 27 transmits the torsional forces from one shaft to the other, in either direction. It also cushions any shocks due to pulsations or inequalities in the drive. Being resilient and flexible, it compensates for any errors in alignment of the shafts. I have found that a coupling constructed in accordance with my invention is quiet and smooth in operation and has a relatively long life.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claim.

What I claim is:

A flexible coupling for connecting driving and driven shafts, comprising a pair of metal disks having plane outer surfaces, a resilient rubber disk interposed between the metal disks and vulcanized thereto, coupling members having hub portions connected to the shafts and having flanges fitting against the metal disks, bolts extending through each of the flanges and threaded into the disks adjacent said flanges for securing the metal disks to the flanges, and radially disposed lugs on the inner surface of the metal disks extending into the rubber, said lugs extending less than half way through the rubber disk.

HARDY NOLEN.

REFERENCES CITED

The following references are of record in the file of this patent:

UNITED STATES PATENTS

| Number | Name | Date |
| --- | --- | --- |
| 2,105,702 | Scholtze | Jan. 18, 1938 |
| 2,290,421 | Fitz Gerald | July 21, 1942 |

FOREIGN PATENTS

| Number | Country | Date |
| --- | --- | --- |
| 42,796 | France | 1933 |
| 479,638 | Great Britain | 1938 |
| 847,562 | France | 1939 |